United States Patent [19]

Moore

[11] 4,422,504
[45] Dec. 27, 1983

[54] PROTECTIVE CLAMP ASSEMBLY

[76] Inventor: Boyd B. Moore, 427 Mignon, Houston, Tex. 77024

[21] Appl. No.: 244,233

[22] Filed: Mar. 16, 1981

[51] Int. Cl.³ ............................................... F16L 3/22
[52] U.S. Cl. .................................... 166/241; 174/47; 308/4 A
[58] Field of Search ............ 166/65 R, 241; 285/373, 285/419; 138/103, 110; 308/4 A; 24/263 R, 263 D, 262; 248/88 R; 174/47

[56] References Cited

U.S. PATENT DOCUMENTS

| | | | |
|---|---|---|---|
| 2,696,367 | 12/1954 | Robishaw | 175/325 X |
| 2,829,190 | 4/1966 | Comlossy, Jr. | 165/65 R X |
| 3,369,607 | 2/1968 | Turbyfill | 166/241 |
| 3,740,801 | 6/1973 | Sears, Jr. et al. | 166/241 |
| 4,011,907 | 3/1977 | Clay | 166/241 |

Primary Examiner—James A. Leppink
Assistant Examiner—Joseph Falk
Attorney, Agent, or Firm—Jack W. Hayden

[57] ABSTRACT

A protective clamp assembly is provided for securing a conductor lines to the production tubing of oil and gas wells and providing for efficient transition of the conductor lines past the various connections of the well tubing. To prevent crushing or other damage to those portions of the conductor lines that are located at tubing connections, the clamp assembly of this invention provides for efficient transition of the conductor lines past the enlarged connections of the tubing. Under circumstances where the tubing is brought into forcible contact with the well casing within which it is received, the protective clamp assembly contacts the well casing thus preventing the well casing from applying crushing force to the conductor lines.

7 Claims, 7 Drawing Figures

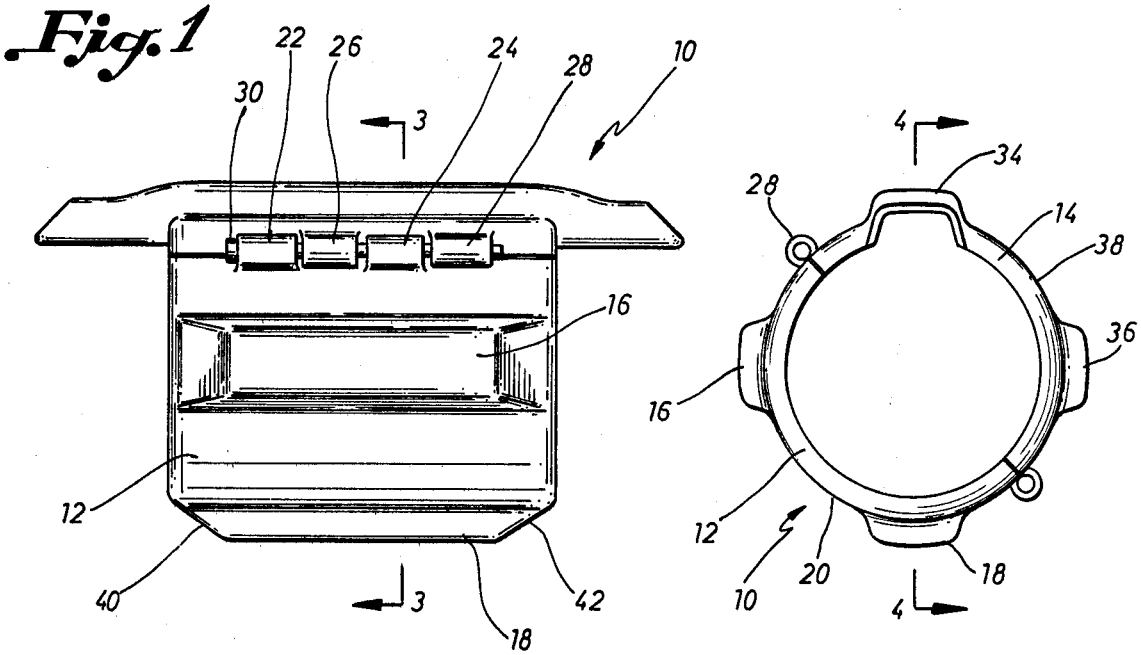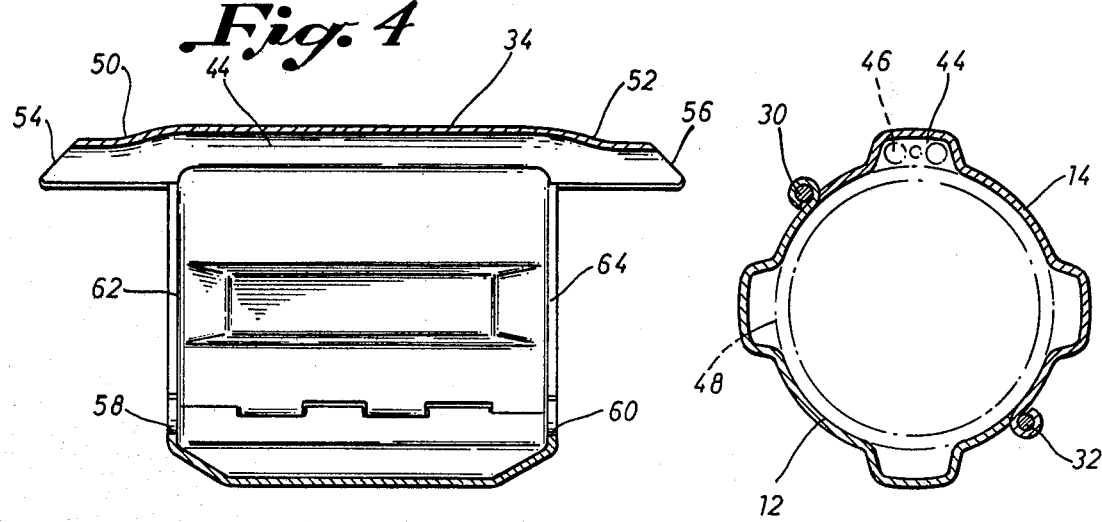

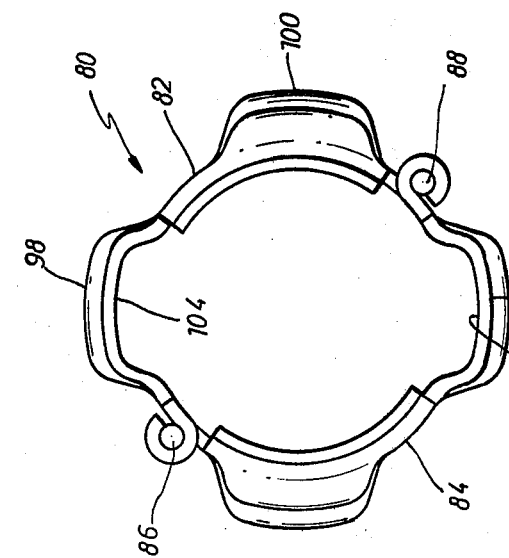
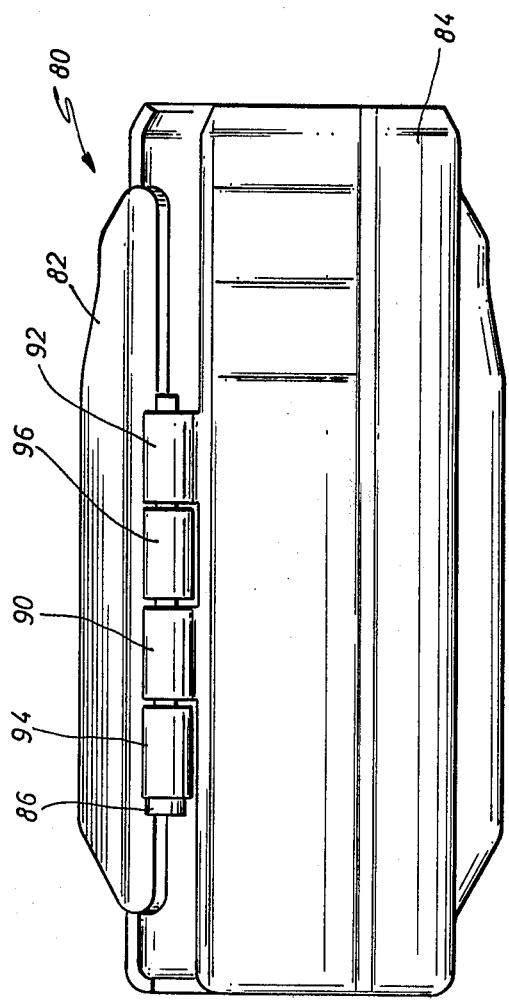
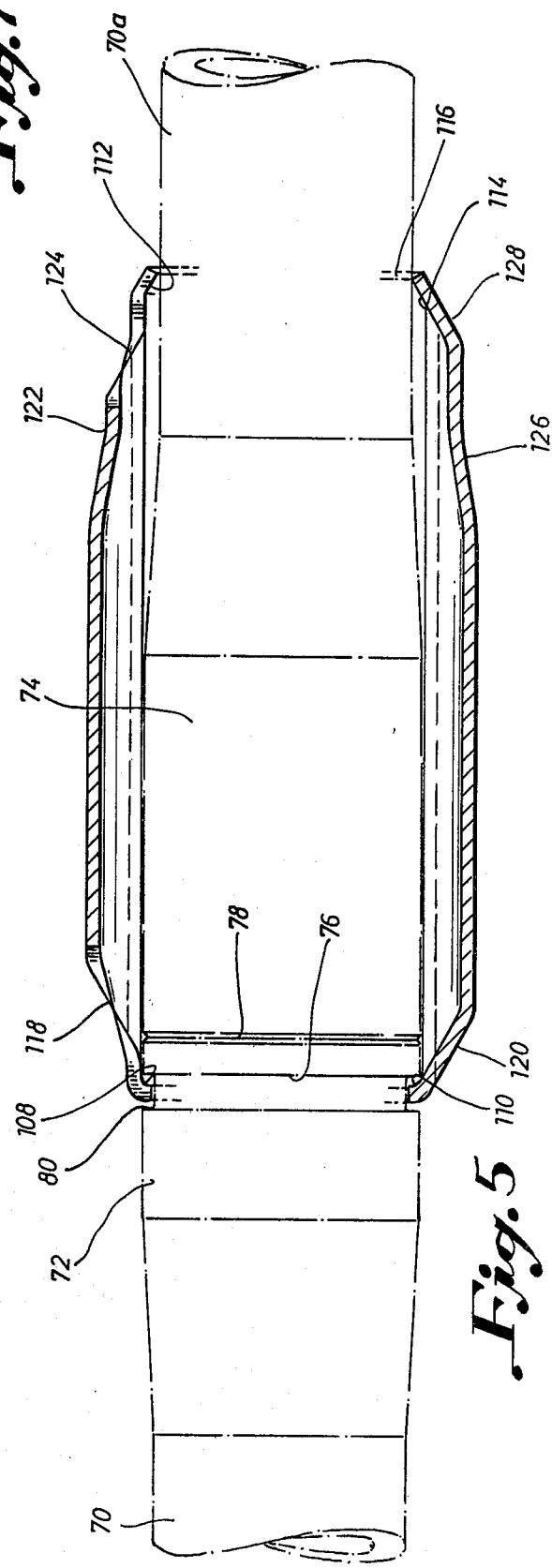

PROTECTIVE CLAMP ASSEMBLY

FIELD OF THE INVENTION

This invention relates generally to oil and gas wells in which conductor lines are employed for the accomplishment of certain downhole activities. More particularly, the present invention is directed to a clamp assembly which is utilized to secure conductor line to oil or gas well production tubing and which provides the conductor line with protection against abrading and crushing forces, especially in the vicinity of the tubing enlargements which are defined by the collars or connections, connecting sections of tubing in assembly.

BACKGROUND OF THE INVENTION

For purposes of this disclosure, the term "conductor line" includes conduit, cable, control line, control cable, power cable, hydraulic lines and other conductors of electricity and/or fluids. The term is intended to mean any shielded or unshielded line to conduct electricity and/or fluids that extends from the surface down through the casing to the site of the downhole activity to be performed. The conductor line may be provided with an outer protective shield and internal electrical conductors for the purpose of transmitting electric power to downhole pumps and other electrical apparatus. The shielding may also contain fluid conductors for the purpose of controlling downhole valves and other apparatus. The shield may also include one or more fluid injection lines for various downhole purposes. The shield may also contain any one of a number of combinations of electrical or fluid conductors without departing from the spirit and scope of this invention.

Under circumstances where it is desired to control activities in an oil or gas well, it is a common practice to extend control lines from the surface down to the site of the intended activity. In most cases, the conductor line is attached to the production tubing as the tubing is run into the well, thereby allowing the tubing to provide a certain degree of physical support for the control cable. A number of different clamp mechanisms have been developed for such purpose such as illustrated by U.S. Pat. No. 3,740,801, which shows the connection of single or multiple conductor lines to the tubing.

Oil and gas production tubing is usually interconnected by threaded joints which are established by internally threaded collars that secured threaded extremities of the tubing in assembly. Most oil and gas well tubing sections have a male and female end with the latter being upset so that its diameter is larger than the diameter of the remaining portion of the section. In some cases, tubing is interconnected by conventional box and pin joints that are provided at the enlarged upset extremities of tubing sections. In either case, when the tubing is assembled, it defines spaced enlargements at each of the couplings. When a conductor line is assembled to such tubing, the conductor line must transition each of the many enlarged collars that are defined by the upset couplings in the tubing string. Obviously, as the tubing string is run into the well, these collars tend to contact the inner surface of the well casing. In some cases, sufficient force is developed between the tubing and well casing that the conductor line transitioning the tubing joints is often crushed or otherwise damaged. Where the well is deviated, the curve in the well bore increases the tendency for the tubing to be forced against the inner surface of the casing in the vicinity of the bend as it is installed or removed from the well. It should also be borne in mind that well casing is defined by casing joints that are also interconnected by means of separate couplings. The opposed extremities of the casing sections may be slightly spaced and may define sharp internal edges at the ends of the casing sections. These sharp edges tend to abrade, scrape or tear conductor lines as the tubing and lines are installed or removed from the well. Where the conductor line has a protective coating of elastomeric or plastic material, rubbing the control line against the inner surface of the casing erodes, tears or otherwise damages the protective coating. Damage to the conductor line is even more prevalent where the conductor line is unprotected as it transitions the various couplings of the tubing string.

SUMMARY OF THE INVENTION

It is, therefore, a principal feature of the present invention to provide a novel conductor line clamp assembly for securing a conductor line to production tubing which provides an efficient protected transition of the conductor line past the various couplings of the tubing string.

It is a further feature of this invention to provide a novel protective clamp assembly for a conductor line which provides efficient protection against abrasive and crushing forces at the various couplings in the tubing string where it is enlarged and where the possibility of damaging the conductor line is the greatest.

It is also an important feature of this invention to provide a novel protective clamp assembly for conductor line which insures location of the conductor at the immediate outer surface of the tubing at each extremity of each of the collars that secure the tubing sections in assembly.

It is another feature of this invention to provide a novel conductor line clamp assembly that establishes an interlocking relationship about connected tubing collars which enables positive retention of the clamp assembly and the conductor line in assembly with the tubing string.

It is also a feature of this invention to provide a novel clamp assembly for securing conductor line to well tubing which is simple, reliable and low cost.

In accordance with this invention, a clamp assembly is developed by die forming heavy sheet metal to form a pair of generally semi-cylindrical clamp body sections. Each of the clamp body sections is formed to define mating hinge members that are secured in assembly by a hinge pin to form a hinge. At the opposite side of each of the clamp body sections is provided mating hinge connector elements that are also capable of being secured in assembly by means of a connector pin or hinge pin.

One of the sections of the clamp assembly is provided with an elongated transition element which is longer than the tubing collar about which it is to be placed. This transition element defines an elongated transition channel within which the conductor line is placed when the clamp is brought into assembly with the tubing. The end portions of each of the clamp body sections define stop members which span the extremities of a tubing collar and have the capability of establishing mechanical stopping engagement with the tubing collar so that the clamp assembly is retained in interlocked assembly with the tubing collar about which it is located. Each of the clamp assembly body sections is further provided with a plurality of longitudinally raised stiffener elements which are deformed from sheet metal during the die forming operation. These longitudinal stiffener elements establish first contact with the inner wall of the casing and thus increase the distance between the conductor line attached to the tubing and the casing when the tubing is installed in the well. One of the raised longitudinal stiffener elements is defined by the elongated conductor line transition element. The stiffener elements also protect the hinge element from being damaged by the interior of the casing.

The conductor line transition element allows the conductor line to pass in smoothly curved relation over the tubing collar about which the clamp is assembled. When the conductor line includes metal tubes for transmitting fluids, the curving relationship that is established is sufficiently gradual that excessive bending stresses are not induced into the conductor line during the assembly process. This feature allows the conductor line to remain mechanically unstressed and, therefore, more resistant to chloride stress corrosion which results from the corrosive environment commonly found in the annulus of oil and gas wells.

BRIEF DESCRIPTION OF THE DRAWINGS

So that the manner in which the above recited features, advantages and objects of the invention, as well as others which will become apparent, are attained and can be understood in detail, a more particular description of the subject invention may be had by reference to the embodiments thereof that are illustrated in the appended drawings, which drawings form a part of this application. It is to be noted, however, that the appended drawings illustrate only typical embodiments of the invention and are not to be considered limiting of its scope, for the invention may admit to other equally effective embodiments.

For a better understanding of this invention, as well as other objects and further features thereof, reference is made to the following detailed description to be read in conjunction with the accompanying drawings, wherein:

FIG. 1 is an elevational view of a conduit clamp structure constructed in accordance with the present invention.

FIG. 2 is an end view of the clamp structure of FIG. 1.

FIG. 3 is a sectional view taken along line 3—3 of FIG. 1 and showing production tubing and a conductor line being positioned therein by way of broken lines.

FIG. 4 is a sectional view taken along line 4—4 of FIG. 2.

FIG. 5 is a view showing a tubing joint formed according to this invention, and illustrating in section a protective clamp assembly in assembly therewith, the clamp assembly representing a preferred embodiment of the invention.

FIG. 6 is an external view of the clamp assembly of FIG. 5.

FIG. 7 is a sectional view of the clamp assembly taken along line 7—7 of FIG. 6.

DETAILED DESCRIPTION OF PREFERRED EMBODIMENT

Referring now to the drawings and first to FIGS. 1 and 2, a clamp assembly is illustrated generally at 10 which incorporates a pair of clamp sections 12 and 14, each being of generally semi-cylindrical form and adapted to be received about opposed portions of a tubing collar. Each of the clamp sections is formed from heavy sheet metal by means of die forming operations so that the resulting clamp assembly is a heavy walled structure capable of withstanding considerable crushing forces without bending or otherwise becoming misshapen. Clamp section 12 is deformed intermediate the extremities thereof to define stiffener portions 16 and 18 that extend radially outwardly of the generally cylindrical outer surface 20 of the clamp section. The stiffener elements 16 and 18 are positioned so as to establish contact with the inner surface of the well casing and maintain the outer surface 20 of the clamp section in spaced relation with the inner wall surface of the well casing. Thus, a conductor line or other object of small cross-sectional dimension, which is extended along the outer surface of the production tubing, will be protected by the stiffener elements from being crushed or otherwise damaged between the tubing and well casing. The stiffener elements also prevent the hinge element of the clamp from being crushed or otherwise damaged by contact with the casing.

It is desirable to establish interconnection of the clamp sections 12 and 14 about the tubing and about the enlarged collars of the tubing. One suitable means for establishing such connection may conveniently take the form shown in the figures where each of the clamp sections 12 and 14 include mating connecting elements. As shown in FIG. 1, clamp section 12 is provided with a pair of connection elements 22 and 24 at one side thereof which mate with connection elements 26 and 28 formed on one side of clamp section 14 and cooperate therewih to define an elongated passage. The coupling elements 22–18 cooperate to define a hinge that is interconnected by means of a hinge pin 30 that extends through the elongated passage defined by the cooperating openings at each of the connector elements. As shown especially in FIGS. 2 and 3, the opposite sides of each of the clamp sections 12 and 14 are also formed to define cooperative connector elements of the same nature as described above in connection with FIG. 1 which are capable of being interconnected to form a hinge by means of a hinge pin 32. With one of the hinge pins 30 or 32 in place, and with the opposite hinge pin removed, the hinged clamp sections 12 and 14, in assembled and open relation, may be brought into assembly about a pipe coupling of the tubing string.

In the die forming operation, the opposite clamp section 14 is also formed to define a pair of stiffener elements such as shown at 34 and 36 which project radially outwardly from the outer generally cylindrical surface portion 38 in the same manner as described above in regard to clamp section 12. While the stiffener element 36 is of a shorter length as compared to the length of the clamp section 14, stiffener portion 34 is of greater length than the length of the clamp section 14 and defines an elongated conduit transition element which is described in detail hereinbelow. The stiffener elements 34 and 36 also function to establish contact with the inner surface of the casing within which the production tubing is located and thus retain the outer surface 38 of the respective clamp section in spaced relation with the casing. This feature protects the conductor line extending along the tubing from being crushed between the tubing couplings and the inner wall of the casing as the tubing is installed in or removed from the well.

Each of the stiffener elements 16, 18 and 36 is formed to define tapered end surfaces at each extremity thereof such as shown at 40 and 42 in FIG. 1. These tapered end surfaces function as cam surfaces or guide surfaces that allow the clamp structure to pass over any internal object within the casing without snagging. As mentioned above, it is not unusual for the ends of casing sections to be spaced as the casing sections are threaded into a collars. These casing end surfaces define sharp internal edges on which objects can snag as they are installed in or withdrawn from the well. Further, these sharp edges tend to scrape or cut any object that is run into the well when such object is moved in contact with the wall surface of the casing. The tapered guide or cam surfaces 40 and 42 will engage any obstruction within the casing, causing the clamp assembly and the tubing to shift transversely by means of cam-like activity as the obstruction is engaged by one of the cam surfaces.

The clamp assembly is manufactured of heavy sheet metal and, therefore, it can be installed into and withdrawn from the well many times before wear requires replacement.

The primary purpose of the clamp assembly of this invention is to secure conductor line to the production tubing so that the conductor line transitions each of the joints of the tubing string. As the conductor line transitions each of the tubing joints, it is necessary to provide external protection to insure that the conductor line is not subjected to crushing or binding forces that might otherwise occur if the coupling of the tubing and the conductor line were brought into forcible engagement with the internal wall surface of the casing. In order to provide such protection for the conductor line, the present invention may conveniently take the form illustrated in the figures wherein the stiffener elements provide a dual function of preventing crushing forces from being applied to the conductor line and establishing an efficient transition of the conductor line past the coupling of the tubing. As is evident from FIGS. 3 and 4, the stiffener element 34 is an elongated structure of greater length than the length of other components of the clamp structure. The stiffener element 34 is thus also a conductor transition element or conductor line protector. As is evident from FIG. 4, the conductor line protector element defines an internal recess or channel 44 within which the conductor line 46 is positioned when the conductor line clamp assembly is brought into assembly with the tubing. In the cross-sectional view of FIG. 3, conductor line 46 is illustrated in broken lines and is shown to be retained within the elongated protective passage that is cooperatively defined by the channel 44 and the production tubing 48, which is also illustrated in broken lines.

The conductor line protector and centralizer element 34 is formed to define inwardly curved extremities 50 and 52 that lie closer to the outer surface of the tubing as compared to the intermediate portion thereof. These inwardly curved extremities function to direct the conductor line at each extremity of the pipe coupling, thus causing the conductor line to be positioned in touching relation or in close proximity to the surface of the tubing. The conductor line, therefore, is caused to take on a smoothly curved form about each of the couplings of the interconnected tubing sections defining the tubing string. The smoothly curved configuration of the conductor line is such that the conductor line is not placed under any undue mechanical stresses that might otherwise occur if it were forced to take on a sharp curvature during installation. Internal stresses are not set up in the conductor line that would be detrimental to the expected long service life thereof. The inwardly curved portions 50 and 52 of the conductor line protector element 34 also function as cam or guide surfaces that engage any obstruction defined internally of the casing and allow the coupling to guide over the obstruction as the production tubing and conductor lines are installed in or removed from the wall. Further, the conductor line protector element 34 defines tapered extremities 54 and 56, further defining cam surfaces or guide surfaces that assist in guiding the clamp assembly past casing joints and any other obstruction inside of the casing. The conductor line protector element 34, by virtue of its configuration, cooperates with the outer surfaces of the collar portion of the tubing to define a smoothly curved channel that extends outwardly of the coupling portion of the tubing. At each extremity of the conductor line protector element, an opening is defined through which the conductor line extends.

It is desirable to insure that the clamp assembly 10 is positively interlocked in assembly with the tubing structure so as to provide the conductor line with a certain degree of support. In accordance with the present invention, and as shown particularly in FIG. 4, the end portions of each of the clamp sections 12 and 14 are turned inwardly so as to define stop flanges 58 and 60. The cooperative stop flanges of each of the clamp sections cooperate to define generally circular openings 62 and 64 that are of sufficient size to readily receive the body portion of the tubing about which the clamp assembly is received. The openings 62 and 64, however, are of insufficient size to receive the enlarged coupling portions defined by the tubing. With the coupling retained between the opposed stop flanges 58 and 60, the stop flanges will engage structure defined by the couplings, thus preventing linear movement of the clamp assembly relative to the tubing string. There is thus established a mechanically interlocked relationship between the clamp assembly and the tubing string that restricts clamp movement relative to the tubing string. Under circumstances where a shielded conductor line is employed which is subjected to retention force by the channel 44 within which the conductor line is received, the clamp assembly is enabled to grip the conductor line and thereby prevent movement of the conductor line through the clamp assembly.

Some manufacturers of petroleum production tubing provide tubing connections of varying lengths. Also, from time to time, it is necessary to remove the tubing from the well in order to replace damaged sections and to perform certain well servicing operations. Since the tubing may be removed from the well a number of times, the threads of the tubing connections may become worn so that rethreading is necessary. When new threads are cut on certain kinds of connections, such as one illustrated in FIG. 5 and made by Hydril Company of 714 West Olympic Boulevard, Los Angeles. Calif., the length of the tubing connection is shortened. It is difficult, therefore, to provide a clamp assembly that will efficiently fit tubing connections having variable lengths.

It is desirable to provide a clamp assembly that may be efficiently positioned in mechanically interlocked relationship with the tubing connections as shown in FIG. 5. Accordingly, in accordance with the present invention, the pin portion 72 of each of the tubing connections is machined in such a manner as to define a shallow annular locking groove 76 that is positioned in slightly spaced relation with the end abutment surface 78 of the tubing connection. Because of the thickness of the enlarged upset portions of the tubing, the resulting outside dimension at the bottom of the locking groove 76 is greater than the outside dimension of the threads on the pin connection of the tubing. The strength of the tubing at the locking groove 76 remains greater than the strength of the outside diameter of the threads on the pin connection. Development of the annular locking groove 76, therefore, does not detract from the strength of the tubing. Moreover, the annular locking groove 76 is formed to define curved surfaces at the bottom portion of the groove where the reduced diameter surface comes into contact with the side wall surfaces of the groove. These rounded surfaces prevent development of stress lines and allow the tubing string to remain of sufficient tensile strength to support its weight within the well.

A clamp assembly capable of establishing an interlocked relationship with the tubing connection is illustrated generally at 80 in FIG. 5. As shown in FIGS. 6 and 7, the clamp assembly incorporates a pair of generally identical clamp sections 82 and 84 that are adapted to be interconnected in assembly by means of hinge pins 86 and 88 that extend through hinge pin receptacles or elongated passages that are cooperatively defined by plural hinge elements at each side of the respective clamp sections. As shown in FIG. 6, a pair of hinge elements 90 and 92 are formed at one side of the clamp section 84 and are spaced in such manner as to receive hinge elements 94 and 96 in cooperative assembly therewith. The hinge elements 92-96 cooperate to define an elongated passage within which is received a hinge pin in the same manner as illustrated above in connection with FIGS. 1-4. The hinge pin typically defines a head portion at one extremity thereof while the opposite extremity defines a tapered portion allowing the hinge pin to also function as a drift pin to bring the hinge elements 92-96 in proper registry as the hinge pin is driven in place by means of a hammer or other suitable instrument. After assembly with the registering hinge elements, the tapered portion of the hinge pin is then bent over by striking it with a hammer in such manner that the pin cannot be removed or become inadvertently disassembled from the clamp assembly unless the tapered portion of the pin is straightened somewhat.

Since each of the clamp sections 82 and 84 are identical, the manufacturing cost thereof is lessened because only one forming die system is necessary. As shown in FIG. 7, each of the clamp sections is formed to define two stiffener elements, as shown at 98 and 100. The stiffener elements of each clamp section provide strength and also function to define wear surfaces which engage the inner surface of the casing as the production tubing and clamps are installed in or removed from the well. Two of these stiffener elements as shown at 98 and 102 are formed to define internal channels 104 and 106 within which the conductor line may be placed when the clamp assembly is brought into assembly with the coupling portions of the tubing.

As shown in FIG. 5, the extremities of each of the clamp sections are formed at one end to define locking flanges 108 and 110 which are received within the annular locking groove 76, thus establishing a mechanically interlocked relationship between the coupling portion of the tubing and each of the sections 82 and 84 of the clamp assembly. At the opposite extremity of each of the clamp sections, the terminal edge portions 112 and 114 are inclined inwardly in such manner as to define an opening 116 through which the tubing extends. The size and position of the opening 116 is such that the clamp assembly will establish a close fitting relationship with the intermediate portion of the tubing, thus achieving accurate orientation of the clamp assembly with respect to the tubing and preventing any inadvertent movement which might otherwise occur.

To insure that the clamp assembly does not snag on obstructions as it passes through the casing, the end portions of the stiffener elements are formed to define tapered guide surfaces. As shown in FIG. 5, a rather sharply inclined guide surface forms one end of each of the stiffener elements as shown at 118 and 120 while guide surfaces of differing angular relationship are formed at the opposite extremity of the stiffener element as shown at 122 and 128. The surfaces 122 and 126 are curved gradually so as to allow the clamp to clear the enlarged upset portions of the interconnected tubing connections. The more sharply tapered end surfaces 124 and 128 may be inclined at the same angular relationship as the opposite end surfaces 118 and 120.

The clamp assembly illustrated in FIGS. 5, 6 and 7 establishes a positively interlocked relationship with the connection portions of tubing joints and provides protective channels through which conductor lines may extend as it transitions each of the connections of the tubing string. Moreover, since each of the clamp sections defines a protective channel as shown at 104 and 106, plural conductor lines may be attached efficiently to a single tubing string if desired. When new threads are cut in the production tubing, the machining operation may also form a new annular locking groove. Since the aperture 116 at the opposite end of the clamp assembly establishes close fitting relation with the intermediate, small diameter portion of the production tubing, shortening of the enlarged upset portions of the tubing due to remachining operations will not be detrimental to the mechanically interlocked and properly oriented relationship of the clamp assembly relative to the tubing structure. The joint structure of the tubing may, therefore, vary substantially and yet the clamp assembly will establish an efficient, properly oriented fit with the tubing connection.

While the foregoing is directed to the preferred embodiments of the present invention, other and further embodiments of the invention may be devised without departing from the basic concept thereof, and the scope thereof is determined by the claims which follow.

I claim:

1. An assembly for establishing protective transition of conductor line about the spaced enlargements formed by threaded connections on a tubular member in a well comprising:

first and second generally semicylindrical body sections;

hinge means along each side of each of said body sections for receiving a hinge pin to secure the assembly on the tubular member;

cooperating means on said body sections and the tubular member to interlock the assembly on the tubular member;

stiffener portions extending radially outwardly of each of said body sections on each side of said hinge means to protect said hinge means against damage;

enclosure means, said enclosure means comprising an internal recess formed on at least one of said body sections by a longitudinal inwardly open channel which extends radially outward of the body section for receiving the conductor line therein to protect the conductor line against crushing as it transitions the spaced enlargements formed by the tubular member threaded connections; and said channel having openings at each end for receiving the conductor line and said channel further including an inwardly curved portion adjacent at least one end thereof to direct the conductor line to close proximity with the tubular member adjacent at least one end of said channel.

2. The assembly of claim 1 wherein said cooperating means include inwardly projecting flanges formed at least on one end of said body sections, and a groove in the tubular member for receiving the inwardly projecting flanges therein to interlock the assembly about the tubular member threaded connections.

3. The assembly of claim 1 wherein said cooperating means includes inwardly extending flanges formed at each end of said body sections and projecting shoulders on the threaded connection for engagement with said flanges to interlock the assembly about the tubular member threaded connections.

4. The assembly of claim 1 wherein said channel is of greater longitudinal extent than the length of said body sections to define extremities, and wherein said inwardly curved portion is on each of said extremities to direct the conductor line to close proximity with the tubular member adjacent each end of said channel.

5. The assembly of claim 1 wherein said stiffener portions extend radially outwardly of each of said body sections at least to the same extent as said hinge means.

6. The assembly of claim 5 wherein said stiffener portions are of a width greater than the width of said hinge means, and wherein said stiffener portions are of a longitudinal extent greater than said hinge means.

7. The assembly of claim 6 wherein said stiffener portions are tapered at each end to assist in guiding the assembly into the well.

* * * * *